Patented Apr. 27, 1926.

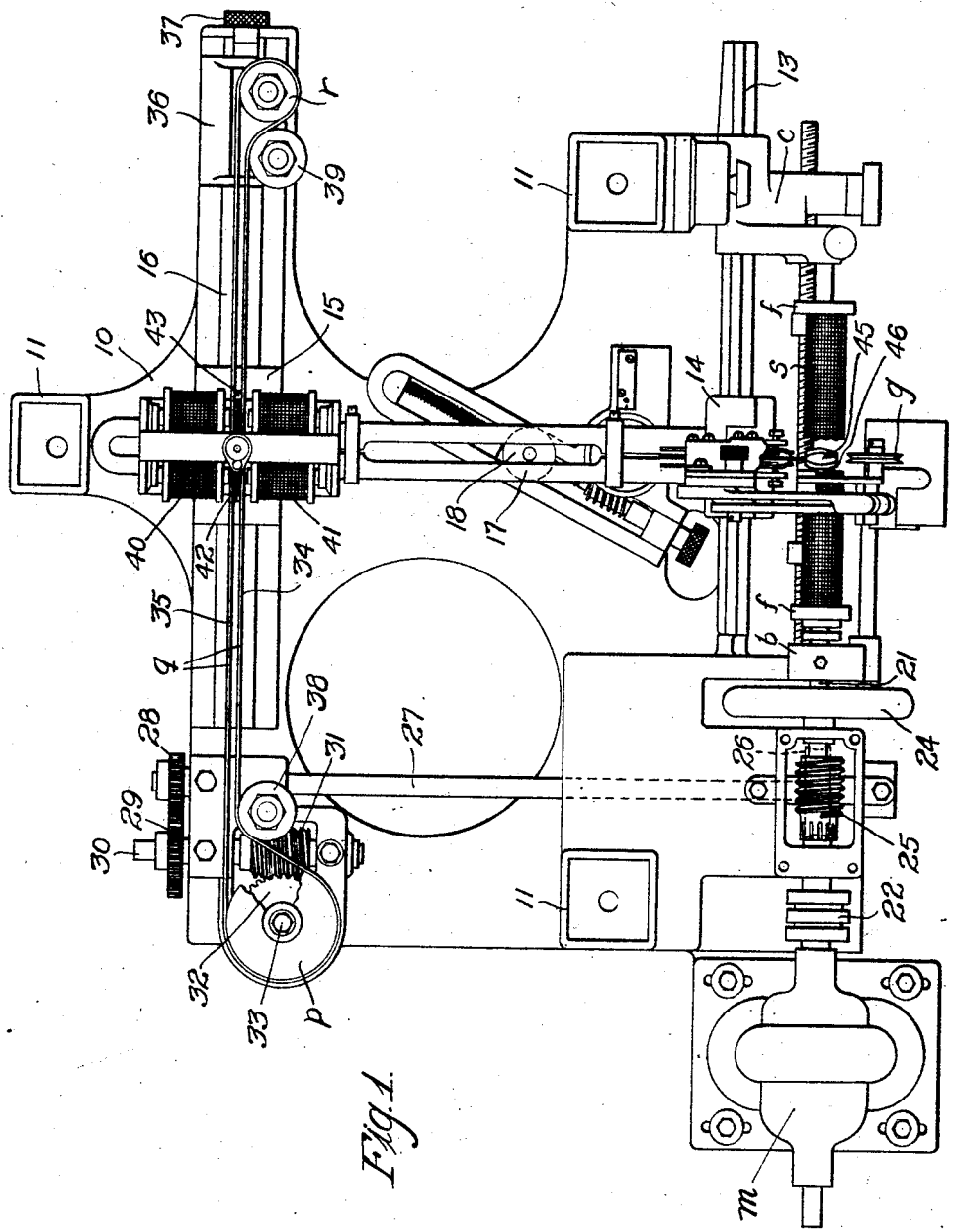

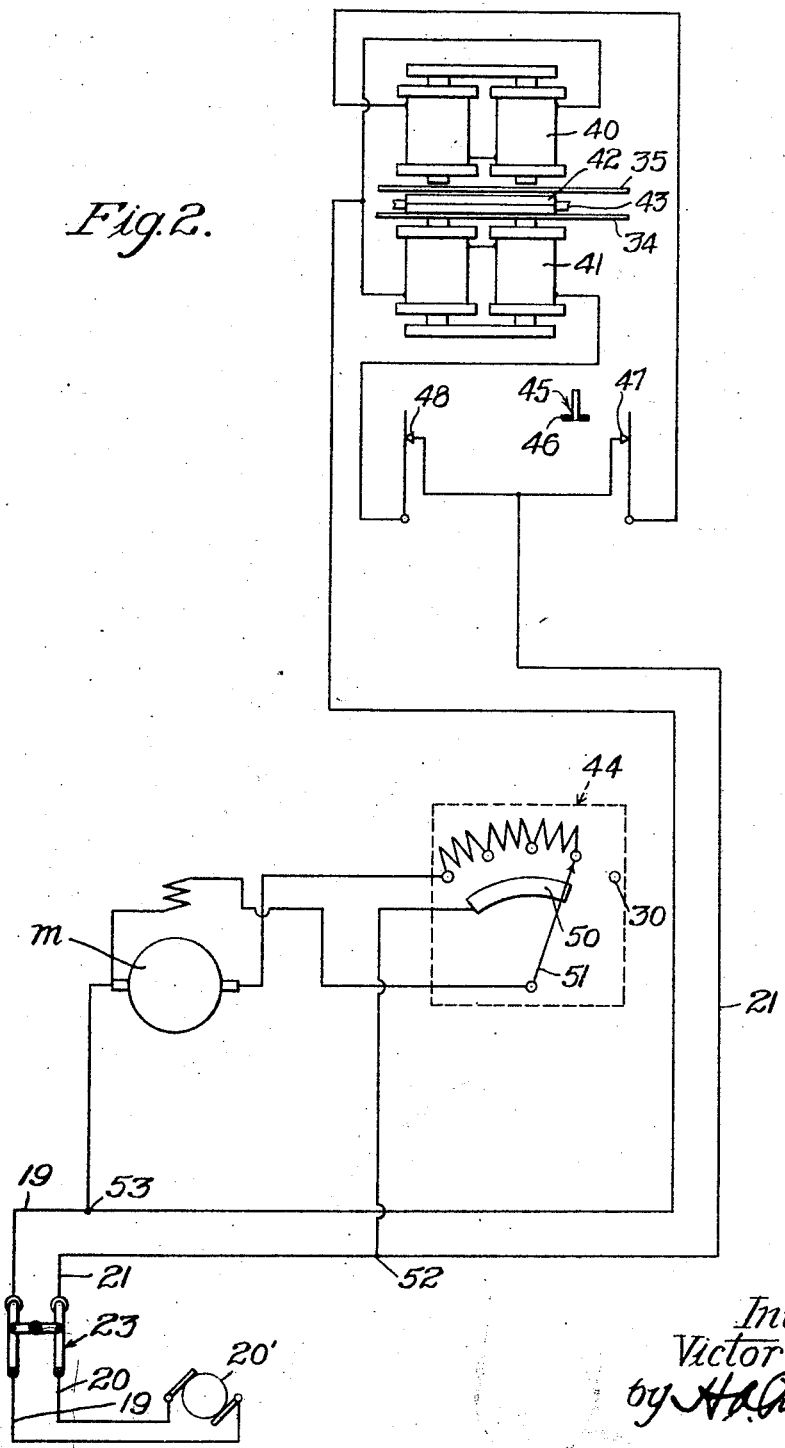

1,582,107

UNITED STATES PATENT OFFICE.

VICTOR WHITESIDE, OF LA GRANGE, ILLINOIS, ASSIGNOR TO WESTERN ELECTRIC COMPANY, INCORPORATED, OF NEW YORK, N. Y., A CORPORATION OF NEW YORK.

CONVEYER.

Application filed December 29, 1922. Serial No. 609,611.

*To all whom it may concern:*

Be it known that I, VICTOR WHITESIDE, a citizen of the United States, residing at La Grange, in the county of Cook and State of Illinois, have invented certain new and useful Improvements in Conveyers, of which the following is a full, clear, concise, and exact description.

This invention relates to conveyers, and particularly to an improved electrical controlling system for conveyers. The invention is especially adapted for use with the type of winding machine shown and described in the U. S. patent to Arthur H. Adams, No. 1,117,620, issued November 14, 1914, and to which reference may be had for a description of the general operation of the mechanism.

The object of the invention is to improve the control of mechanism of the above mentioned type.

In the winding of electrical coils of the type for which the above mentioned mechanism is adapted shunt wound motors are preferably used for driving the mechanism since such motors maintain a constant speed throughout wide variations in load and voltage.

Mechanism of the above mentioned type includes an electro-magnetic device for reversing the direction of travel of the wire guide which for economical reasons is connected in multiple with the driving motor.

In accordance with the general features of the invention the armature and field coil circuits of the shunt wound motor are opened simultaneously when the motor starting switch is opened, by providing a suitable contact on the rheostat which is opened when the line switch is opened to simultaneously open both motor circuits, thereby preventing any inductive disturbance which might be caused by leaving the field coil connected to the circuit which includes the electro-magnetic device for reversing the direction of travel of the wire guide. Also the magnets have been connected so that like poles are positioned oppositely, thereby causing a repelling instead of an attractive force to be exerted between the magnets, thus causing a greater concentration of the magnetic flux from the closest magnets through the armature.

In the drawings, Fig. 1 is a plan view of a winding machine of the above mentioned type, and Fig. 2 is a diagram of the improved electrical circuit for the winding mechanism.

Referring to the drawings, the major part of the mechanism of the device is mounted on a frame 10 having hollow spacing pieces 11, which may be fixed to the under side of a suitable table (not shown). A track or runway 13 having a head block $b$ and a tail block $c$ carries a front carriage 14, provided with a grooved guide $g$ for guiding the insulated wire in helical convolutions onto the spool which is to be filled with wire. Spool $s$ has flanges $f$, one at each end, usually circular in outline as shown. A back carriage 15 travels on a track 16; the two carriages 14 and 15 being mechanically united by a lever 17 oscillating on a pivot at 18. One end of lever 17 is suitably pivoted to the back carriage 15, and the opposite end is pivoted to the front carriage 14. The front carriage 14 travels in the reverse direction with respect to the movement of the back carriage 15. The motor $m$ which drives or operates the machine as shown, is connected directly to the arbor 21 by means of an insulating coupling 22. The arbor 21 supports the spool $s$, to be wound with the wire. There is a hand wheel 24 on shaft or arbor 21 operated as a hand brake for stopping the machine when the requisite number of turns have been put upon the spool.

The main shaft or arbor 21 has fixed upon it a worm 25 gearing with a worm wheel 26, fixed on a shaft 27, and upon the opposite end of the shaft 27 is a gear wheel 28. The wheel 28 meshes with wheel 29 upon a short shaft 30 bearing a worm 31 meshing with a gear wheel 32 on a short vertical shaft 33 on which is fixed a pulley $p$. Passing around pulley $p$ is a driving belt $q$ made of some fabric, like woven linen and having two parallel sections 34 and 35, moving in respectively opposite directions. This belt $q$ passes around idle pulley $r$ located on a movable support 36 adjustable to and fro with respect to pulley $p$ by a screw operated by a thumb piece 37, by which means belt $q$ may be tightened. The loose pulleys 38 and 39 are used to adjust the belt and maintain sections 34 and 35 in substantially parallel relation. Two double coil electromagnets 40 and 41 moving with the rear carriage 15 have a common armature 42, pivoted at 43. The belt passes on opposite sides of armature 42, the two sections moving in opposite directions, as already explained, and when the armature 42 is attracted to one side or the other, the belt section 34 or 35 is gripped between the pair of magnet poles and the armature, and the carriage 15 is carried along in one direction according to whether the belt section 34 or 35 is gripped. From the electrical connections shown in Fig. 2, it will be noticed that a circuit is normally closed through the winding of both magnets so that the like magnetic poles are opposite. Mounted on the front carriage 14 is a contact member 45 carrying a hard rubber shoe 46 and as shown in Fig. 1, shoe 46 is located in the line of movement of the coil in position to engage flanges $f$.

Assuming that the carriage 14 is started from the right hand end of the spool, the travel is away from the right hand flange $f$ laying the turns of the wire upon the spool as it continues toward the opposite end of the spool. Assuming the belt as locked against the cores of magnet 41 since the armature 42 is attracted by the magnet 41 the flux produced thereby being concentrated in the armature, when the front carriage 14 reaches the left hand end of the spool, shoe 46 will strike the left hand spool flange $f$ and the contact 48 will be opened, breaking the circuit through the coils of magnet 41, the armature 42 is drawn over to the magnet coil 40 clutching the carriage 14 to section 35 of the belt, thus reversing the movement of such carriage. As soon as the left hand flange of the spool leaves the shoe 46, in its travel in the new direction, contact 48 is again closed reestablishing the circuit through the winding of magnet 41, but the magnetic flux produced by the current flowing therethrough opposes the flux from magnet 40, thus concentrating the flux from the latter magnet through the armature to secure the carriage 15 to section 35 of the belt. When the right hand flange $f$ of the spool strikes shoe 46, contact 47 is opened to break the circuit including the windings of magnet 40 whereupon magnet 41 alone being energized shifts armature 42 from the magnet 40 toward magnet 41. Section 35 of the belt is thus released from the carriage and the belt section 34 is clamped between the armature 42 and the magnet 41, causing the carriage to move in its original assumed direction. The operation is repeated, spool shoe 46 next striking the left hand spool flange $f$, and so on in succession until the operator stops the machine.

The electromagnets are connected with like poles opposite, as indicated in Fig. 2, so that the flux produced by the inside poles of the magnets 40 opposes the flux produced by the inside poles of magnets 41. This insures the armature being gripped with the section 34 of the belt against the corresponding poles of the magnets 41, with a maximum pressure since the flux produced by such magnets is concentrated in the armature.

It will be noted that no magnetic circuit exists from the poles of the magnets on one side of the armature to the poles of the magnets on the other side of the armature. In this manner the magnetic flux produced by the magnets nearer the armature is concentrated in the armature and no stray flux can flow to the opposing magnets.

In the diagram, 19 and 20 represent the conductors of a line leading from a suitable source of current supply indicated at 20'. A double pole line switch is indicated at 23 for closing and opening the circuit to the motor $m$ and the double coil magnets 40 and 41. A rheostat 44 is also included in the motor circuit. A contact plate 50 adapted to make contact with a contact member on a handle 51 of the rheostat while the line circuit is closed and included in the armature circuit is mounted on the rheostat.

To start the mechanism the switch 23 is closed and the motor circuit may be traced as follows:

From one terminal of the source of supply 20' through lead 20, one side of switch 23, conductor 21 to the point 52, contact plate 50, handle 51, winding of the rheostat, motor $m$, and returning to the lead 19 at the point 53. When the line switch is opened to stop the machine to allow an operator to make a splice in the wire there will be no inductive kick given from the motor field coils due to the simultaneous breaking of the motor field and armature circuits when the rheostat handle 51 returns to a dead contact 30.

The breaking of the motor field and armature circuits simultaneously, prevents the armature 42 between the electromagnets 40 and 41 from being shifted to the opposite side which would result in the carriage traveling in the opposite direction and cause the operator, before closing the line switch, to reverse the position of the armature 42.

It has been found that the shifting of the carriage from one section of the belt to the other is accomplished much more quickly provided both sets of electromagnets are energized during the movement of the carriage so that it is not necessary for a flux to be completely built up by the electromagnets to which the armature is to be shifted.

What is claimed is:

1. In a conveyer, an element, a carriage, a plurality of electro-magnets, an armature therefor, and circuit connections for said electro-magnets to cause said armature to be attracted by one of said electro-magnets to attach said carriage to said element and to produce opposing magnetic fluxes for maintaining said armature nearer said one of said magnets.

2. In a conveyer, a plurality of elements, means for causing relative movement therebetween, a plurality of electro-magnets, an armature therefor, and circuit connections for said electro-magnets to cause said armature to be attracted by one of said electro-magnets thereby causing a cessation of the relative movement of said elements and to produce opposing magnetic fluxes for maintaining said armature nearer said one of said magnets.

3. In a conveyer, a moving element, a carriage, a plurality of electro-magnets, an armature therefor, circuit connections for said electro-magnets to cause said armature to be attracted by one of said electro-magnets to cause the carriage to be moved by said element and to produce opposing magnetic fluxes for maintaining said armature nearer said one of said magnets.

4. In a conveyer, a plurality of elements, means for causing relative movement therebetween, a plurality of electro-magnets, an armature therefor, circuit connections for causing the said armature to be attracted by one of said electro-magnets for causing a cessation of the relative movement between the elements, and additional circuit connections for causing another of said electro-magnets to produce a magnetic flux in opposition to that of the first-mentioned electro-magnet to assist in causing the cessation of the relative movement between the elements.

5. In a conveyer, a moving element, a carriage, a plurality of electro-magnets, an armature therefor, circuit connections for causing said armature to be attracted by one of said electro-magnets to cause the carriage to be moved by the element, and additional circuit connections for causing another of said electro-magnets to produce a magnetic flux in opposition to the flux produced by the first-mentioned electro-magnet to assist in maintaining such movement of said carriage.

6. In a conveyer, an element having differently moving sections, a carriage, a pair of electro-magnets, an armature therefor intermediate the sections of said element, selectively controlled circuit connections for causing said armature to be attracted by one of said electro-magnets and for producing a magnetic flux in opposition to that produced by the first-mentioned electro-magnet, thereby gripping one section of the element between the armature and the first-mentioned selected electro-magnet for moving the carriage in the direction of the movement of the selected section of said element.

7. In a conveyer, a moving element, a carriage, a first electro-magnet, an armature for causing the carriage to be moved by the element, a second electro-magnet having a magnetic circuit included with the armature in the magnetic circuit of the first electro-magnet, circuit connections for causing the first electro-magnet to produce a magnetic flux for attracting the armature, and additional circuit connections for causing the second electro-magnet to produce a magnetic flux in opposition to that produced by the first electro-magnet for preventing the flow of flux from the first electro-magnet through the magnetic circuit of the second electro-magnet.

8. In a conveyer, a moving element, a carriage, a first electro-magnet, an armature included in the magnetic circuit thereof for causing the carriage to be moved by the element, a second electro-magnet having poles included in said magnetic circuit, circuit connections for causing the first electro-magnet to attract the armature, and additional circuit connections for causing the second electro-magnet to produce a magnetic flux in opposition to that flowing therein from the first electro-magnet, thereby concentrating the magnetic flux from the first electro-magnet in the armature.

9. In a conveyer, a belt having oppositely moving, parallel disposed sections, a carriage, a pair of electro-magnets, an armature therefor intermediate the belt sections, and selectively controlled circuit connections for causing said armature to be attracted from either of said electro-magnets and for producing magnetic flux in opposition to that produced by the first mentioned electro-magnet, thereby gripping one section of the belt between the armature and the first mentioned electro-magnet for moving the carriage in the direction of movement of said belt section.

10. In a conveyer, a belt, a motor having shunt and armature circuits for driving said belt, a source of current connected with said motor, a carriage adapted to be driven by said belt, electro-magnetic means for controlling the attachment of said carriage to said belt, said means comprising a plurality of electro-magnets, an armature controlled thereby, and circuit connections for said electro-magnets to produce opposing magnetic fluxes for maintaining said armature nearer one of said magnets, thereby attaching said carriage to said belt, circuit connections including said source of power and said motor, and switching means for simultaneously removing said source from the shunt and the armature circuits of said motor, thereby preventing any disturbances caused by opening said circuits from affecting said electro-magnetic means.

11. In a conveyer, an element, a motor having shunt and armature circuits for moving said element, a source of current connected with said motor, a carriage adapted to be moved by said element, a plurality of electro-magnets, an armature, circuit connections for causing said armature to be attracted by one of said electro-magnets to cause said carriage to be moved by said element, additional circuit connections for causing another of said electro-magnets to produce a magnetic flux in opposition to the flux produced by the first-mentioned electro-magnet to assist in maintaining said carriage in moving engagement with said element, further circuit connections including said source of power and said motor, and switching means for simultaneously removing said source from the shunt and the armature circuits of said motor, thereby preventing any disturbances caused by opening said shunt and armature circuits from affecting said electro-magnets.

12. In a conveyer, an element, a motor having shunt and armature circuits for causing different movements of different sections of said element, a source of current connected with said motor, a carriage adapted to be moved by said element, a pair of electro-magnets, an armature therefor intermediate the sections of said element, selectively controlled circuit connections for causing said armature to be attracted from either of said electro-magnets and for producing a magnetic flux in opposition to that produced by the first-mentioned electro-magnet, thereby gripping one section of the element between the armature and the first-mentioned electro-magnet for moving the carriage in the direction of movement of said section of said element, and switching means for simultaneously removing said source from the shunt and the armature circuits of said motor, thereby preventing any disturbances caused by opening said circuits from affecting said electro-magnets.

13. In a conveyer, a carriage, driving means therefor, a motor for controlling said driving means, said motor having shunt and armature circuits, a source of current connected to the circuits of the motor, electro-magnetic means also connected to said source of current for connecting said carriage to said driving means, said means comprising a plurality of electro-magnets, an armature controlled thereby, and circuit connections for the electro-magnets to produce opposing magnetic fluxes for maintaining said armature nearer one of said magnets, thereby attaching said carriage to said driving means, a switch for opening the connection between said armature circuit and said source, and means controlled thereby for simultaneously opening the circuit connections to said shunt circuit to prevent any inductive effect produced by opening either circuit from reaching said electro-magnetic means.

14. In a winding machine, the combination of a power driven spool, a wire guide and means for moving the guide to and fro, said means having differently moving sections, and an electro-magnetic device for connecting the guide first with one section and then with the other section of said means, said electro-magnetic device comprising a plurality of magnets with like poles oppositely disposed, whereby a repelling action is exerted upon the opposite poles.

15. In a winding machine the combination of a power driven spool, a wire guide and means for moving the guide to and fro consisting of a power driven endless belt having oppositely moving sections in proximity, and an electro-magnetic device for connecting the guide first with one section and then the other of said belt, said electro-magnetic device comprising a plurality of magnets with like poles oppositely disposed, whereby a repelling action is exerted upon the opposite poles.

16. In a winding machine, the combination with a power driven spool, a wire guide and means for moving the guide to and fro consisting of an element having oppositely moving sections in proximity, a source of current, a shunt wound motor for driving said spool and said driving means connected thereto, an electro-magnetic device connected in multiple with the motor to said source of current, an armature therefor, circuit connections for causing an electro-magnet to produce a magnetic field including and extending beyond the armature for causing the guide to be moved by the driving element, additional circuit connections for concentrating the flux in the armature to maintain the guide in driving engagement with the element, and means for opening the field and armature circuits of said motor simultaneously when the source of current is disconnected therefrom to prevent any inductive disturbance passing over the line to disturb the position of the armature of the electro-magnet.

17. In an electrical control system, a source of current, a motor connected thereto and having shunt and armature circuits, a pair of electro-magnets arranged in said circuit in multiple with said motor, said magnets connected in multiple with each other and in such manner that when energized their like poles are opposed, a switch for connecting and disconnecting the source of current to and from the motor and magnets, and a second-switch designed to open both the field and armature circuits of said motor.

In witness whereof, I hereunto subscribe my name this 21 day of December A. D., 1922.

VICTOR WHITESIDE.